(12) United States Patent
Dyle Kim et al.

(10) Patent No.: US 10,518,712 B1
(45) Date of Patent: Dec. 31, 2019

(54) VEHICLE STORAGE SYSTEM AND VEHICLE INCLUDING THE VEHICLE STORAGE SYSTEM

(71) Applicant: GM GLOBAL TECHNOLOGY OPERATIONS LLC, Detroit, MI (US)

(72) Inventors: Taryn Dyle Kim, Detroit, MI (US); Sam K. Kim, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/022,022

(22) Filed: Jun. 28, 2018

(51) Int. Cl.
*B60R 7/04* (2006.01)
*B60N 3/10* (2006.01)

(52) U.S. Cl.
CPC ............... *B60R 7/04* (2013.01); *B60N 3/101* (2013.01)

(58) Field of Classification Search
CPC .................. B60R 7/04; B60N 3/101
USPC .. 296/24.34, 37.8, 37.12, 37.13, 37.14, 37.1
See application file for complete search history.

(56) References Cited

U.S. PATENT DOCUMENTS

| | | |
|---|---|---|
| 8,172,294 B1 | 5/2012 | Hooton |
| 8,360,494 B2 | 1/2013 | Quiros Perez |
| 8,480,151 B2 | 7/2013 | Gaudig et al. |
| 9,421,916 B1 | 8/2016 | Dyle |
| 9,834,148 B2 | 12/2017 | Gaudig et al. |
| 2012/0091744 A1* | 4/2012 | McKnight ............... B60R 11/00 296/24.34 |

* cited by examiner

*Primary Examiner* — Joseph D. Pape

(57) ABSTRACT

A vehicle storage system includes a structure with a storage compartment at least partially defined by a bottom surface. The storage compartment defines an opening in an upper surface of the structure through which the storage compartment is accessible. The system further includes a plurality of flexible protruberances extending vertically upward from the bottom surface into the storage compartment.

18 Claims, 4 Drawing Sheets

VEHICLE STORAGE SYSTEM AND VEHICLE INCLUDING THE VEHICLE STORAGE SYSTEM

FIELD

The present disclosure relates to a vehicle storage system and a vehicle including the vehicle storage system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicles typically include storage compartments accessible from the passenger compartment for holding the belongings of the driver or passengers. For example, a vehicle may include a glove box (or glove compartment) formed within the instrument panel in front of a passenger seat. A glove box typically includes a door that selectively closes off the glove box from the interior compartment to retain items stored therein. Other storage compartments may include storage boxes formed within a center console, pockets integrated into internal surfaces of doors and/or the like. A problem with many of these vehicle storage solutions is that they are limited to the size of objects that may be placed within them while adequately controlling the positioning of the item within the storage space. A vehicle storage space which is designed and sized to accommodate items of specific sizes is inflexible as such a storage space might be unable to accommodate items having other sizes. To overcome this problem, a vehicle storage space may be made larger. However, an item which is smaller than the storage space may tend to undesirably rattle or vibrate and/or move around within the storage space. This may result in damage to the item and/or undesirably contribute to noise in the vehicle cabin.

A vehicle storage system which may flexibly accommodate items of various different sizes and, especially, items which may be of smaller size, while ensuring that the items are held in a manner which reduces and/or prevents vibration is needed. It would also be beneficial is such a system could accommodate not only items of generally small size, but adaptable to flexibly accommodate items of a larger size.

SUMMARY

In an exemplary aspect, a vehicle storage system includes a structure with a storage compartment at least partially defined by a bottom surface. The storage compartment defines an opening in an upper surface of the structure through which the storage compartment is accessible. The system further includes a plurality of flexible protuberances extending vertically upward from the bottom surface into the storage compartment.

In this manner, a vehicle storage compartment may securely hold any number of items having different sizes and shapes.

In another exemplary aspect, the structure is an arm rest in a vehicle.

In another exemplary aspect, the structure is a center console in a vehicle.

In another exemplary aspect, the structure is a cargo area in a vehicle.

In another exemplary aspect, the plurality of flexible protuberances is integrally formed with a lower elastomeric member in contact with the bottom surface of the storage compartment.

In another exemplary aspect, the plurality of flexible protuberances is integrally formed with the bottom surface of the storage compartment.

In another exemplary aspect, the plurality of flexible protuberances extend from the bottom surface to a plane aligned with the upper surface of the structure.

In another exemplary aspect, the system further includes a vertically-walled enclosure having a lower portion positioned between the plurality of flexible protuberances.

In another exemplary aspect, the vertically-walled enclosure defines a rectangular shaped enclosure.

In another exemplary aspect, the vertically-walled enclosure defines a cylindrically shaped enclosure.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
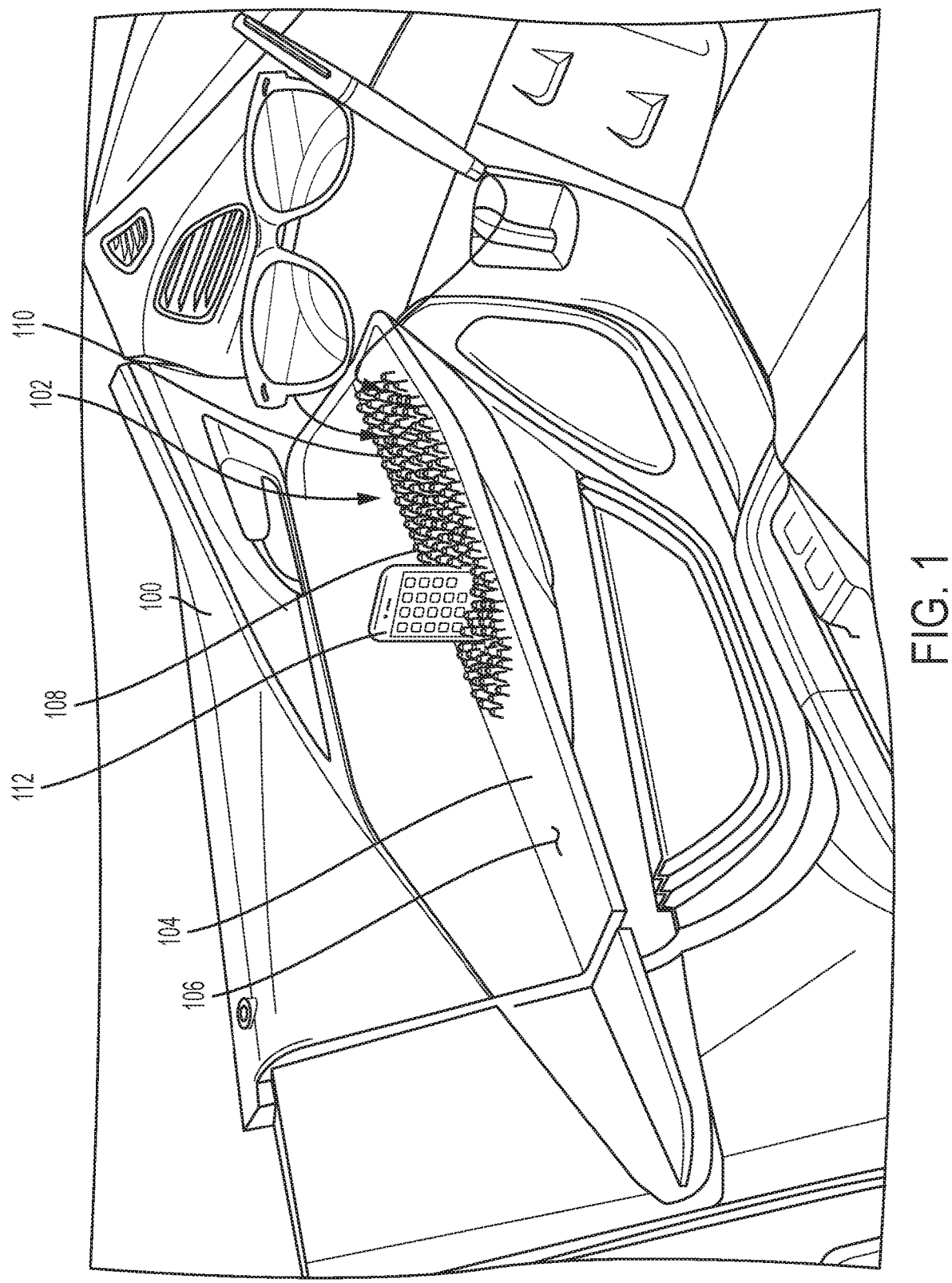
FIG. 1 is a perspective view of a passenger vehicle door incorporating an exemplary embodiment of a vehicle storage system.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 1 is a perspective view of a passenger vehicle door 100 incorporating an exemplary embodiment of a vehicle storage system 102. The passenger vehicle door 100 includes an arm rest 104 having a top surface 106 on which a passenger may rest their arm while sitting in the vehicle. A forward portion of the top surface 106 includes an exemplary embodiment of a vehicle storage system 102 in accordance with the present disclosure. The vehicle storage system 102 includes a plurality of flexible fingers or protruberances 108 which extend vertically upward from a bottom surface (not visible) of a compartment that extends downwardly from the top surface 106 of the arm rest 104. Preferably, the protruberances 108 extend upwardly from the bottom surface of the compartment a length which places the top ends 110 of each of the protruberances 108 in substantial alignment with the top surface 106.

FIG. 1 illustrates a mobile phone 112 that is positioned between a plurality of the protruberances 108 of the vehicle storage system 102. The plurality of protruberances 108 of the vehicle storage system 102 may also easily accommodate any number of small items between them regardless of their sizes and/or shapes without limitation. For example, a pair of sunglasses 114 and/or a pen 116 may easily be positioned between a plurality of protruberances 108 of the vehicle storage system 102. As an item is inserted into the vehicle storage system 102, the item slides between adjacent protruberances 108 and each protruberance 108 elastically deforms in response to contacting the surfaces of the item. Each of the protruberances 108 elastically deforms while continuing contact with the outer surfaces of the item. As a result of the elastic deformation, each of the protruberances 108 in contact with the item exerts a reaction force on the object. In this manner, the protuberances 108 grip and hold any object that is positioned in the vehicle storage system 102. Additionally, the elastic deformation and gripping forces applied by the protuberances 108 on an object positioned in the system 102 isolates that object from vibrations and/or prevents motion of that object within the storage compartment. This minimizes or prevents any noise and/or vibration of objects that otherwise might have occurred when these types of objects are positioned in conventional passenger vehicle storage compartments.

The ability to accommodate smaller items in an arm rest 104 of the passenger vehicle door 100 using the vehicle storage system 102 of the present disclosure does not adversely impact the ability of the arm rest 104 to continue to serve as an arm rest for a vehicle passenger. Further, not only may the vehicle storage system 102 in the arm rest 104 flexibly accommodate and hold items of varying sizes and shapes, the vehicle storage system 102 also permits fingers of a passenger's hand to extend downwardly into the arm rest 104 and enables the passenger's hand to grip the arm rest and use the arm rest as a handle to move the passenger vehicle door 100 when entering and/or exiting the vehicle.

Figure 2:
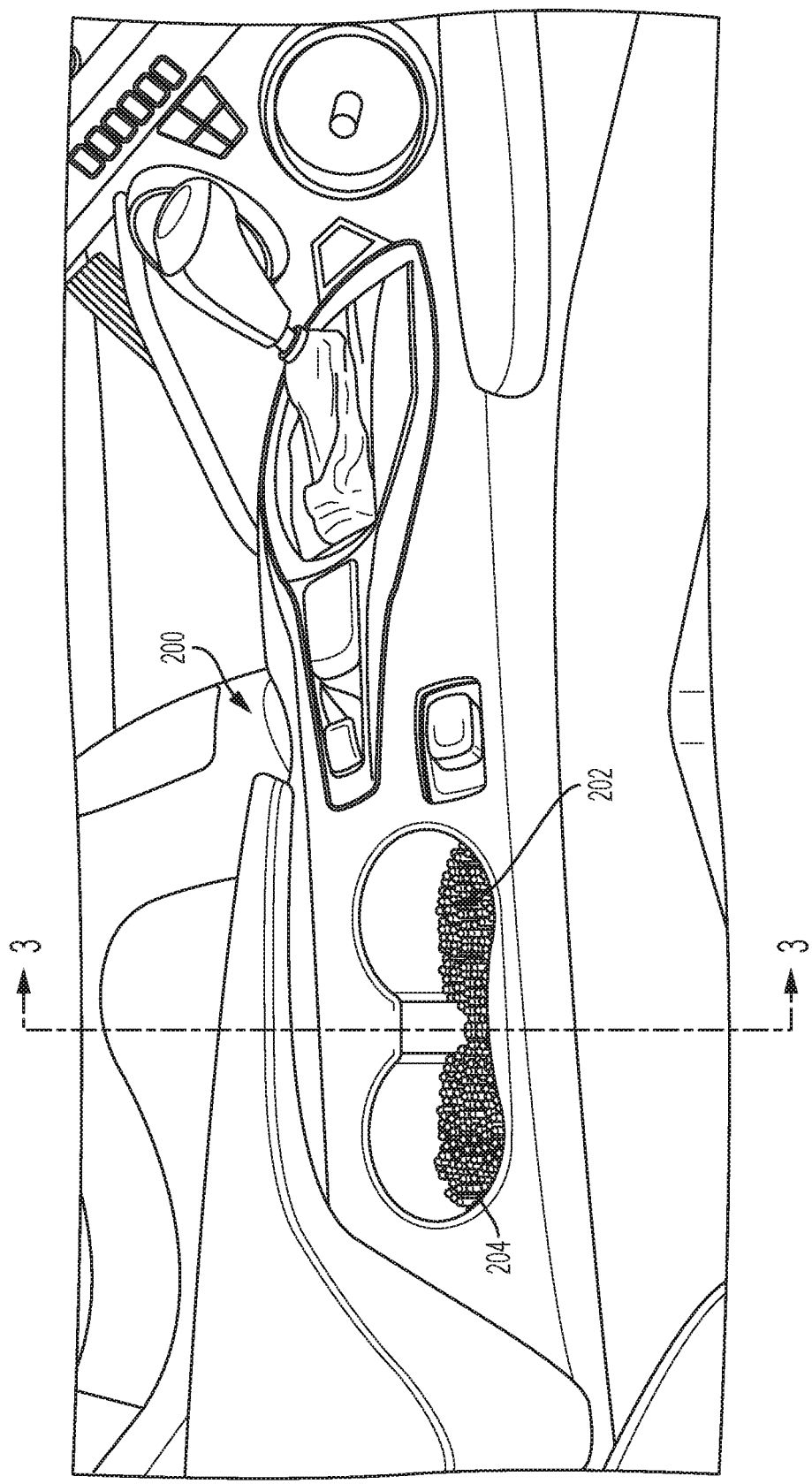
FIG. 2 is a perspective view of a passenger vehicle center console incorporating another exemplary embodiment of a vehicle storage system.

FIG. 2 is a perspective view of a passenger vehicle center console 200 incorporating another exemplary embodiment of a vehicle storage system 202. The center console 200 includes a storage compartment having a plurality of protruberances 204 extending upward from a bottom surface (not visible) of the compartment. Conventionally, a passenger vehicle center console may include a storage compartment which is shaped to function as a cup holder for cups of a limited range of sizes. Smaller items positioned in these conventional cup holder compartment are not held in position within the compartment and, thus, tend to move around and vibrate within the compartment. In stark contrast, the plurality of protruberances 204 in the vehicle storage system 202 of the present disclosure provides the ability to hold items of varying sizes and shapes, hold those items in position and to isolate those items from vibration. Further, as will be illustrated and explained with reference to FIG. 4, the vehicle storage system 202 may also function as a cup holder when a vertically-walled enclosure (see, for example, FIG. 4) is positioned within the system 202. A vertically-walled enclosure may easily slide downwardly into the system 202 between a plurality of protruberances and, as a result, be firmly held in position. In this manner, the vertically-walled enclosure may define, for example, a cylindrical space therein to accommodate and hold a cup. Vertically-walled enclosures having various sizes and shapes may then be selected which adapt to the unique requirements of vehicle passenger according to their preferences. Vehicle passengers are, thus, no longer limited to storing items of predetermined shapes and/or sizes and now have the ability to store and flexibly adapt the vehicle storage system in accordance with their own preferences.

Figure 3:
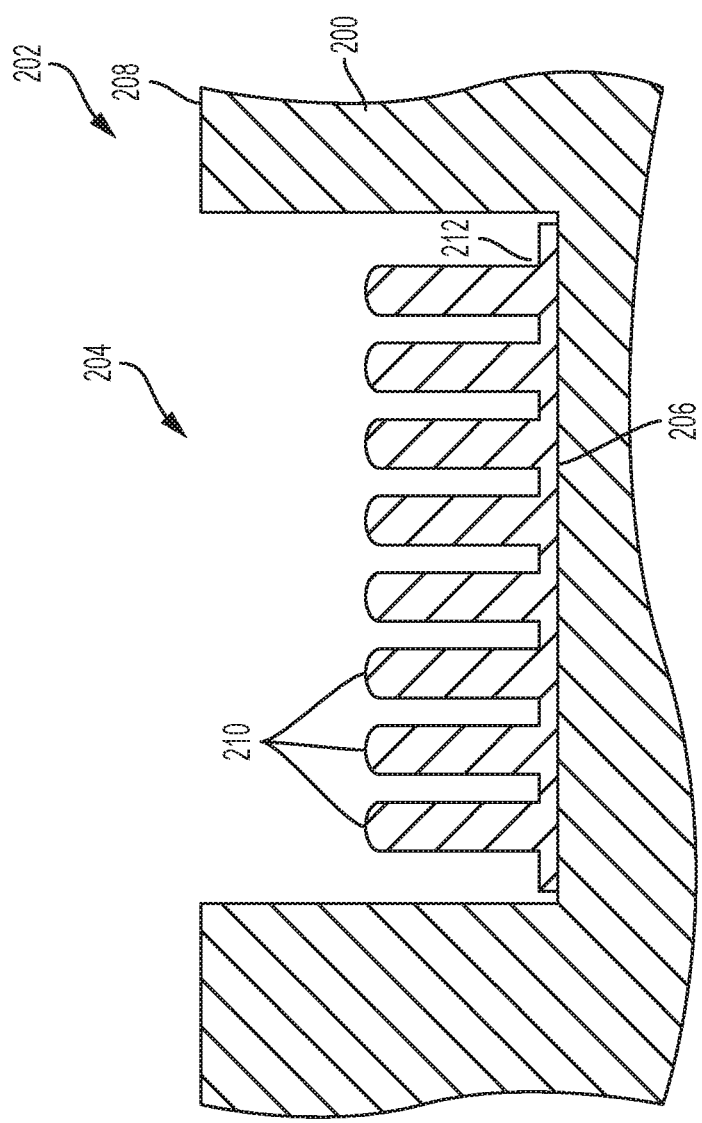
FIG. 3 is a cross-sectional view of the vehicle storage system of FIG. 2.

FIG. 3 is a cross-sectional view of the vehicle storage system 202 of FIG. 2. The system 202 includes a plurality of protruberances 204 extending upwardly from a bottom surface 206 of a compartment in the center console 200. The console 200 includes an upper surface 208 and the compartment extends downwardly into the console 200 from the upper surface 208. Each of the plurality of protruberances 204 extends a distance upwardly from the bottom surface 206 such that the distal ends 210 of the plurality of protruberances substantially align with the upper surface 208. In the exemplary vehicle storage system 202, the plurality of protruberances 204 are connected to each other through a lower elastomeric member 212. The lower elastomeric member 212 contacting the bottom surface 206 of the compartment in the center console 200. The lower elastomeric member 212 may rest on the bottom surface 206 and, therefore, the plurality of protruberances 204 may be selectively removed from the compartment for cleaning and/or for other reasons. Alternatively, the plurality of protrusions may be integrated into the bottom surface 206 of the console 200.

Figure 4:
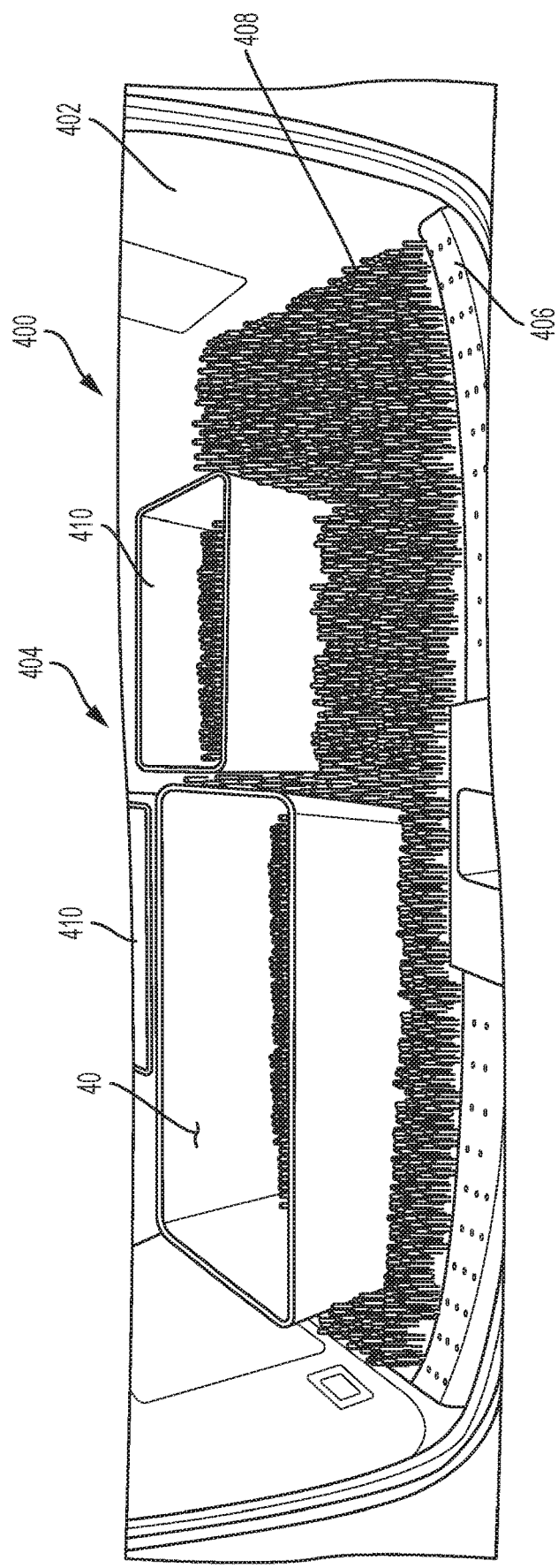
FIG. 4 is a perspective view of a cargo area of a passenger vehicle incorporating yet another exemplary embodiment of a vehicle storage system.

FIG. 4 is a perspective view of a cargo area 400 of a passenger vehicle 402 incorporating yet another exemplary embodiment of a vehicle storage system 404. The vehicle storage system 404 includes a lower elastomeric member 406 which, in this embodiment, substantially covers the entire load floor of the cargo area 400. A plurality of protruberances 408 extend upwardly from the lower elastomeric member 406. In a manner similar to that described with reference to FIGS. 1-3, the plurality protuberances 408 may accommodate any number of smaller items of varying shapes and sizes between them such that the items are resiliently held between a plurality of the protruberances 408. The top ends of each of the plurality of protruberances 408 substantially align with each other in a plane. The planar aligned ends of the plurality of protruberances 408, therefore, may support items having larger sizes and varying shapes in a manner similar to that of the load floor of the conventional vehicle cargo area. In this manner, the function of the cargo area is not adversely impacted.

The vehicle storage system 404 of FIG. 4 also includes a plurality of vertically-walled enclosures 410. Lower portions of each of the plurality of vertically-walled enclosures may be inserted between a plurality of protruberances 408 such that the vertically-walled enclosures may be firmly and resilient held in position within the cargo area 400. In this manner, the vertically-walled enclosures 410 may divide the cargo area 400 into any number of sizes and shapes to flexibly accommodate items of varying sizes and shapes. The vertically-walled enclosures 410 may be define an internal area having any size or shape, without limitation.

While the present disclosure illustrated exemplary vehicle storage systems embodied in a vehicle passenger door, a vehicle center console, and a cargo area, it is understood that a vehicle storage system may be located anywhere within a vehicle without limitation.

It is also understood that while the plurality of protruberances described herein may all have shared a similar length, it is understood that the plurality of protruberances may have varying lengths, diameters, shapes, and be made from any resilient material and form a portion of the present disclosure without limitation. Further, the arrangement of the plurality of protruberances may be positioned in any pattern and/or randomly without limitation.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle storage system comprising:
    a structure including a storage compartment at least partially defined by a bottom surface, wherein the storage compartment defines an opening in an upper surface of the structure through which the storage compartment is accessible;
    a plurality of flexible protruberances extending vertically upward from the bottom surface into the storage compartment; and
    a vertically-walled enclosure having a lower portion positioned between the plurality of flexible protruberances.

2. The vehicle storage system of claim 1, wherein the structure comprises an arm rest in a vehicle.

3. The vehicle storage system of claim 1, wherein the structure comprises a center console in a vehicle.

4. The vehicle storage system of claim 1, wherein the structure comprises a cargo area in a vehicle.

5. The vehicle storage system of claim 1, wherein the plurality of flexible protruberances is integrally formed with a lower elastomeric member in contact with the bottom surface of the storage compartment.

6. The vehicle storage system of claim 1, wherein the plurality of flexible protruberances is integrally formed with the bottom surface of the storage compartment.

7. The vehicle storage system of claim 1, wherein the plurality of flexible protruberances extend from the bottom surface to a plane aligned with the upper surface of the structure.

8. The vehicle storage system of claim 1, wherein the vertically-walled enclosure defines a rectangular shaped enclosure.

9. The vehicle storage system of claim 1, wherein the vertically-walled enclosure defines a cylindrically shaped enclosure.

10. A passenger vehicle comprising:
    a structure including a storage compartment at least partially defined by a bottom surface, wherein the storage compartment defines an opening in an upper surface of the structure through which the storage compartment is accessible;
    a plurality of flexible protruberances extending vertically upward from the bottom surface into the storage compartment; and
    a vertically-walled enclosure having a lower portion positioned between the plurality of flexible protruberances.

11. The vehicle of claim 10, wherein the structure comprises an arm rest in a vehicle.

12. The vehicle of claim 10, wherein the structure comprises a center console in a vehicle.

13. The vehicle of claim 10, wherein the structure comprises a cargo area in a vehicle.

14. The vehicle of claim 10, wherein the plurality of flexible protruberances is integrally formed with a lower elastomeric member in contact with the bottom surface of the storage compartment.

15. The vehicle of claim 10, wherein the plurality of flexible protruberances is integrally formed with the bottom surface of the storage compartment.

16. The vehicle of claim 10, wherein the plurality of flexible protruberances extend from the bottom surface to a plane aligned with the upper surface of the structure.

17. The vehicle of claim 10, wherein the vertically-walled enclosure defines a rectangular shaped enclosure.

18. The vehicle of claim 10, wherein the vertically-walled enclosure defines a cylindrically shaped enclosure.

* * * * *